US012770052B2

(12) United States Patent
Rakhmanberdieva et al.

(10) Patent No.: US 12,770,052 B2
(45) Date of Patent: Oct. 20, 2026

(54) MODEL-INDEPENDENT DATA EXTRACTOR CONFIDENCE VALUE PREDICTION MACHINE LEARNED MODEL

(71) Applicant: SAP SE, Walldorf (DE)

(72) Inventors: Nurzat Rakhmanberdieva, Berlin (DE); Alexey Streltsov, Heidelberg (DE); Christian Reisswig, Berlin (DE)

(73) Assignee: SAP SE, Walldorf (DE)

( * ) Notice: Subject to any disclaimer, the term of this patent is extended or adjusted under 35 U.S.C. 154(b) by 1088 days.

(21) Appl. No.: 17/354,202

(22) Filed: Jun. 22, 2021

(65) Prior Publication Data

US 2022/0366301 A1 Nov. 17, 2022

Related U.S. Application Data

(60) Provisional application No. 63/187,047, filed on May 11, 2021.

(51) Int. Cl.

*G06N 20/00* (2019.01)
*G06F 18/2431* (2023.01)
*G06N 3/02* (2006.01)
*G06V 30/412* (2022.01)

(52) U.S. Cl.

CPC ......... *G06N 20/00* (2019.01); *G06F 18/2431* (2023.01); *G06N 3/02* (2013.01); *G06V 30/412* (2022.01)

(58) Field of Classification Search

CPC ........ G06N 20/00; G06N 3/02; G06V 30/412; G06F 18/2431

See application file for complete search history.

(56) References Cited

U.S. PATENT DOCUMENTS

2019/0332666 A1* 10/2019 Dadachev ............. G06F 40/284
2021/0073532 A1* 3/2021 Torres .................. G06V 30/414

(Continued)

FOREIGN PATENT DOCUMENTS

WO WO-2021057133 A1 * 4/2021

OTHER PUBLICATIONS

Goldberg, Yoav. "A primer on neural network models for natural language processing." (2015): 1-75. (Year: 2015).*

(Continued)

*Primary Examiner* — Miranda M Huang
(74) *Attorney, Agent, or Firm* — SCHWEGMAN LUNDBERG & WOESSNER, P.A.

(57) ABSTRACT

In an example embodiment, a confidence score is computed for a predicted label (from a first model) for information extracted from a document. The confidence score is computed using a machine learned model different than the first model which is based on a Sliding-Window method. The Sliding-Window method may be based on convolutional neural networks classification, using sliding windows. It receives as input (1) the string of extracted information from an independent previous information extracted step (the "input text"), (2) the string's predicted class label, (3) the string's coordinate location in the document, and (4) the text of the document (for additional context information). The Sliding-Window method's task is to predict the confidence score to determine the correctness of the predicted label for the information.

20 Claims, 8 Drawing Sheets

(56) References Cited

U.S. PATENT DOCUMENTS

2021/0125034 A1* 4/2021 Nguyen ................. G06N 3/084
2022/0171967 A1 6/2022 Reisswig

OTHER PUBLICATIONS

Majumder, Bodhisattwa Prasad, et al. “Representation learning for information extraction from form-like documents.” proceedings of the 58th annual meeting of the Association for Computational Linguistics. 2020. (Year: 2020).*
Bekker, Jessa, and Jesse Davis. “Learning from positive and unlabeled data: A survey.” Machine Learning 109.4 (2020): 719-760. (Year: 2020).*
Yu, Wenwen, et al. “PICK: Processing Key Information Extraction from Documents using Improved Graph Learning-Convolutional Networks.” arXiv e-prints (2020): arXiv-2004. (Year: 2020).*
Kim, Yoon. “Convolutional neural networks for sentence classification.” arXiv preprint arXiv:1408.5882 (2014). (Year: 2014).*
Xu, Yiheng, et al. “Layoutlm: Pre-training of text and layout for document image understanding.” Proceedings of the 26th ACM SIGKDD international conference on knowledge discovery & data mining. 2020. (Year: 2020).*
Rolnick, David, et al. “Deep learning is robust to massive label noise.” arXiv preprint arXiv:1705.10694v3 (2018). (Year: 2018).*
Pishchulin, Leonid, et al. “Deepcut: Joint subset partition and labeling for multi person pose estimation.” Proceedings of the IEEE conference on computer vision and pattern recognition. 2016. (Year: 2016).*
“European Application Serial No. 22165301.7, Extended European Search Report mailed Sep. 16, 2022”, 11 pgs.
Guo, Chuan, et al., “On Calibration of Modern Neural Networks”, arXiv:1706.04599v2, [Online]. Retrieved from the Internet: <URL: https://arxiv.org/pdf/1706.04599.pdf>, (2017), 14 pgs.
Kendall, Alex, et al., “Bayesian SegNet: Model Uncertainty in Deep Convolutional Encoder-Decoder Architectures for Scene Understanding”, arXiv:1511.02680v2, [Online]. Retrieved from the Internet: <URL: https://arxiv.org/pdf/1511.02680.pdf>, (2016), 11 pgs.
Zhang, Xiang, et al., “Character-level Convolutional Networks for Text Classification”, arXiv: 1509.01626v3, [Online]. Retrieved from the Internet: <URL: https://arxiv.org/abs/1509.01626>, (2016), 9 pgs.
“Chinese Application No. 202210367893.8 Office Action mailed on Mar. 14, 2026”, 15 pgs.

* cited by examiner

MODEL-INDEPENDENT DATA EXTRACTOR CONFIDENCE VALUE PREDICTION MACHINE LEARNED MODEL

CROSS-REFERENCE TO RELATED APPLICATIONS

This application claims the benefit of U.S. Provisional Application No. 63/187,047, filed May 11, 2021, which is incorporated herein by reference in its entirety.

BACKGROUND

Extraction of information from documents is a process that may be performed by many different types of models, from advanced deep learning machine learned models to simpler pattern matching processes using rules. These models output a prediction of what they think the particular word/phrase in a document is, which is indicative of its meaning or purpose. In other words, they output a predicted label for the extracted data.

BRIEF DESCRIPTION OF DRAWINGS

The present disclosure is illustrated by way of example and not limitation in the figures of the accompanying drawings, in which like references indicate similar elements.

DETAILED DESCRIPTION

The description that follows discusses illustrative systems, methods, techniques, instruction sequences, and computing machine program products. In the following description, for purposes of explanation, numerous specific details are set forth in order to provide an understanding of various example embodiments of the present subject matter. It will be evident, however, to those skilled in the art, that various example embodiments of the present subject matter may be practiced without these specific details.

Many machine learned models fail to output confidence scores indicating how reliable the prediction is, and the ones that do output confidence scores may not be outputting reliable confidence scores. The result is that it can be difficult to perform any sort of automation using the extracted information. Thus, humans must continue to be part of the workflow loop, double checking whether a model's prediction of an extracted field is correct or incorrect. Adding to this issue is the fact that oftentimes multiple different models may be used for the extraction, such as by having different fields extracted using different models.

Furthermore, it can be difficult to obtain a reliable single confidence score when multiple models are used to make predictions related to the extraction of information from a document. One technique for dealing with this would be by leveraging an independent confidence scoring model using a denoising autoencoder type network, based on, for example, a 2-dimensional chargrid representation. Such a confidence scoring model, however, is relatively large and requires long inference and training times.

In an example embodiment, a confidence score is computed for a predicted label of extracted information using a smaller, lightweight and fast method. This method is terms a Sliding-Window method.

In an example embodiment, the Sliding-Window method is based on convolutional neural networks classification, using sliding windows. It receives as input (1) the string of extracted information from an independent previous information extracted step (the "input text"), (2) the string's predicted class label, (3) the string's coordinate location in the document, and (4) the text of the document (for additional context information). The Sliding-Window method's task is to predict the confidence score to determine the correctness of the given input.

Figure 1:
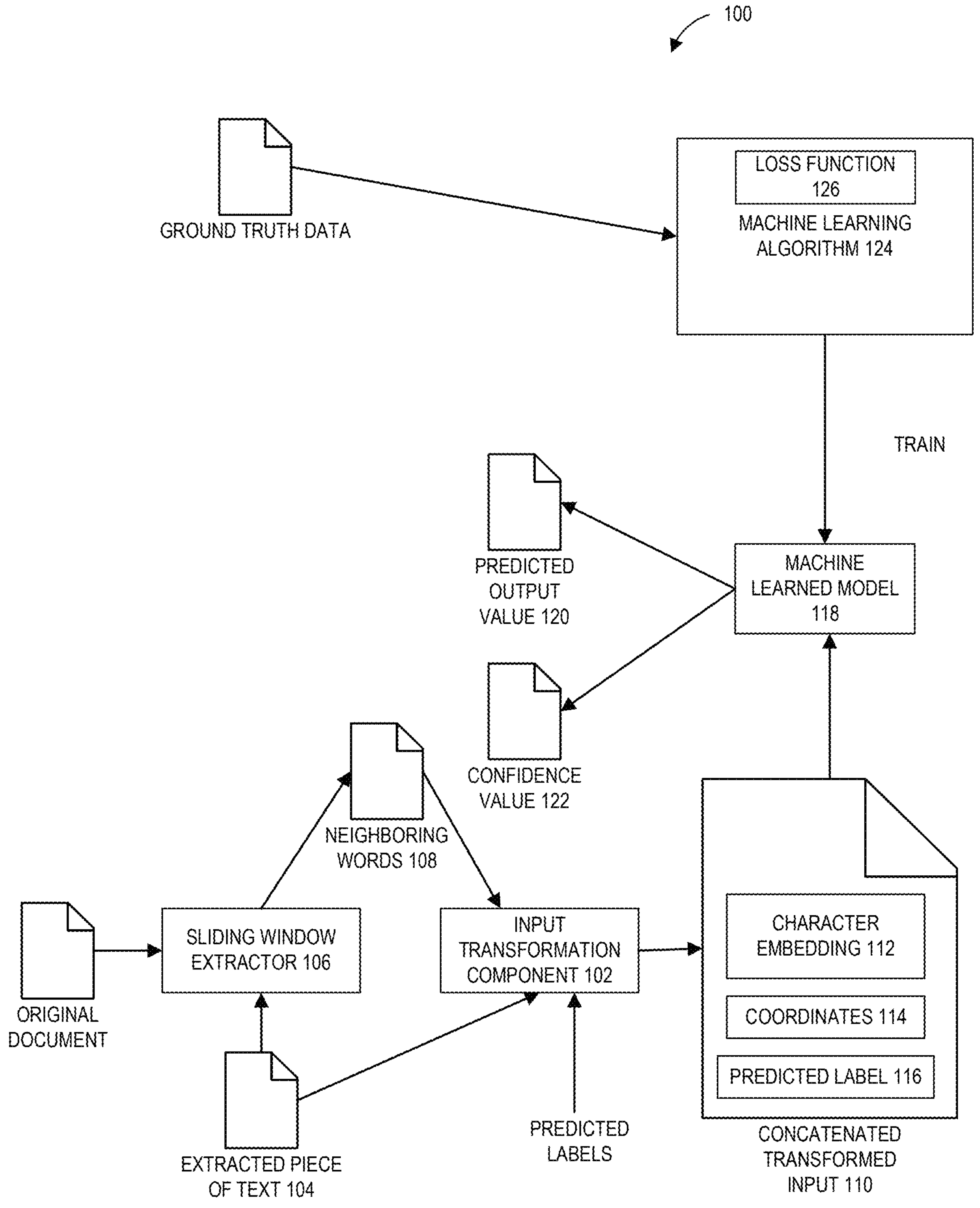
FIG. 1 is a block diagram illustrating an example system for using a sliding window machine learned model.

FIG. 1 is a block diagram illustrating a system 100 for using a sliding window machine learned model in accordance with an example embodiment. An input transformation component 102 obtains an extracted piece of text 104 from an independent model (whether machine learned or rules-based). This extracted piece of text may be, for example, text in a field of a document. A sliding window extractor 106 then additionally extracts a sliding window of text neighboring the extracted piece of text 104 in the original document. This extracted sliding window may be called "neighboring words" 108. It should be noted that while in some embodiments the sliding window extractor 106 may perform this extraction from the original document in which the extracted piece of text 104 is contained, it is also possible for the sliding window extractor 106 to perform the same technique on just a portion of the original document.

In an example embodiment, the sliding window extractor 106 may perform its extraction by selecting neighboring words or characters spatially separated from the input text up to some distance, essentially creating a bounding box surrounding the extracted piece of text 104. This distance may be different in the vertical direction than in the horizontal direction, making this bounding box a rectangle, but it is not necessary that this shape be utilized. In other example embodiments, the bounding box may be square, round, oval, or any other geometric shape. How the bounding box is specified may then be based on the geometric shape (e.g., circles may be specified using a radius, rectangles using a length and width, etc.).

Figure 2:
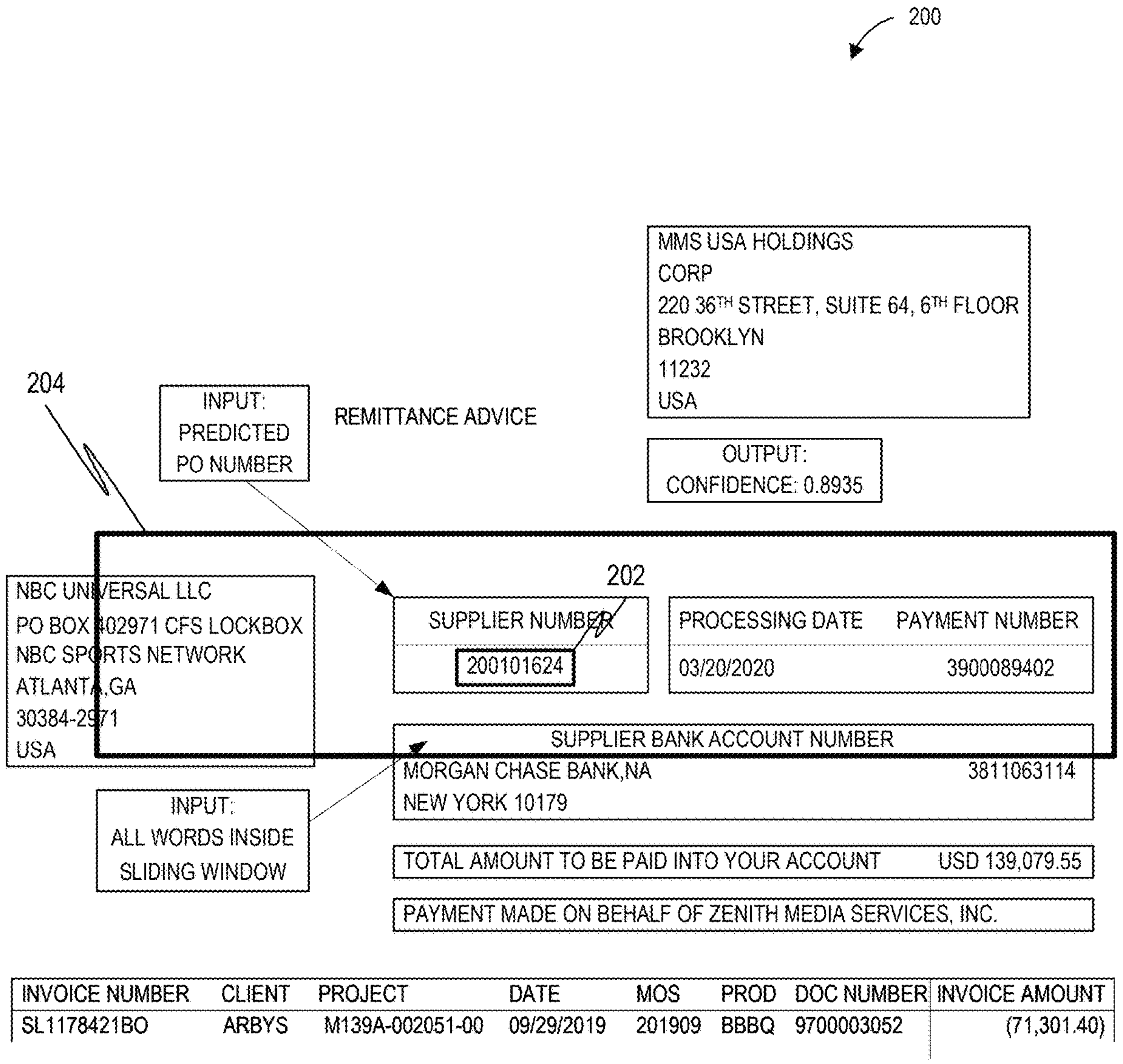
FIG. 2 is a diagram illustrating an example screen capture showing a bounding box.

FIG. 2 is a diagram illustrating a screen capture showing a bounding box 200 in accordance with an example embodiment. As can be seen, the extracted piece of text 202 is surrounded by a rectangular bounding box 204. Notably, the independent model has predicted that the extracted piece of text 202 is a purchase order (PO) number. Words completely appearing within the bounding box are considered to be neighboring words to the extracted piece of text 202, while words completely outside the bounding box are not considered to be neighboring words to the extracted piece of text 202. How words that are partially within the bounding box and partially outside the bounding box (such as "Universal" in FIG. 2) are handled is implementation-specific. In some embodiments, partial words simply do not count as neighboring words at all (i.e., 100% of the word must be within the bounding box for it to be considered a neighboring word), while in other embodiments, partial words count as neighboring words if the percentage of the word that is within the bounding box meets or exceeds some threshold (e.g., 50% of the word must be within the bounding box for it to be considered a neighboring word).

Referring back to FIG. 1, the input transformation component 102 then takes the extracted piece of text 104, the neighboring words 108, and the predicted labels for the extracted piece of text 104 and the neighboring words 108 and forms a concatenated transformed input 110 from them. The predicted labels for the neighboring words could come from the same model as the predicted label for the extracted piece of text 104, or may come from one or more different models. Indeed, different neighboring words may have predicted labels from different models. The concatenated transformed input 110 is a sequence of vectors, with each vector corresponding to a different character of either the extracted piece of text 104 or one of the neighboring words. The sequence may begin with the vectors for the extracted piece of text 104 and then be followed by the vectors for the neighboring words. Each vector may include a character embedding 112, coordinates 114, and a predicted label 116.

The character embedding 112 may be constructing using one of many different types of character embedding processes. In one example embodiment, a one hot encoding process is utilized. One hot encoding is a process by which a token, such as a character, is turned into a unique integer index, and then this integer index is turned into a binary vector of size N (N being the size of the character vocabulary), using a classification of the character. The binary vector is all zeroes except for the ith entry, which would be 1. This is why it is called "one hot", because one of the bits is hot (1) while the others are cold (0). A similar implementation called "one-cold", in which one of the bits is cold (0) while the others are hot (1) could also be used, as could any number of other processes that produce a unique vector representation of a character/classification combination.

The coordinates are the (geometrical) coordinates of the character in the document. How these coordinates are represented depends on how the geometry of the document is represented. Some documents may be represented using a system where each character or space for a character is represented as a single coordinate, while other documents may be represented by a system where each character or space for a character is represented as potentially multiple coordinates (for example, where each pixel in the document is assigned a different coordinate and each character comprises a number of pixels). In systems where the latter is the case, the coordinates of a character could either be represented as a sequence representing the corners of the characters (e.g., four coordinates, each representing a different corner of the rectangle encompassing the character), or could be represented a single coordinate representing the "middle" of the character (i.e., the geometric point exactly between the horizontal edges of the character and exactly between the vertical edges of the character).

The predicted label of the character is taken from the predicted label of either the piece of text 104 in which the character resides, or the predicted label of the neighboring word in which the character resides.

The concatenated transformed input 110 may then be passed to a machine learned model 118 to produce a predicted output label 120 and confidence value 122. During training of the machine learned model 118, a machine learning algorithm 124, including a loss function 126, receives ground truth data, including sample inputs with "true labels" assigned to them. The machine learned model 118 repetitively adjusts weights used in the machine learned model 118, until the loss function 126 is satisfied.

The predicted output label 120 is produced at inference time, and may itself be fed back into the machine learning algorithm 124 as feedback to retrain the machine learned model 118. The predicted output label 120 and associated confidence value 122 can be used to confirm or reject the predicted label from the original model.

This approach takes into account the semantic environment (i.e., context) of the input text under consideration. For this, along with the standard input text, the neighboring words and their respective labels are used to enrich the input text.

It should be noted that in some cases a bounding box identifying neighboring words may not be readily available. In such cases, a bounding box can be constructed by performing string intersection with words obtained via an optical character recognition (OCR) process performed on the document. Since OCR output contains words and their corresponding bounding boxes, the bounding boxes can be obtained via these matched instances. For string matching, soft matching may be used, where some hyperparameters threshold (such as 80%) is set. If the string intersection coefficient exceeds this threshold, it is considered a match. Soft matchings may be used because in real life strings may not exactly match due to errors introduced by the OCR engine, human error, or previous pre- and post-processing steps.

Figure 3:
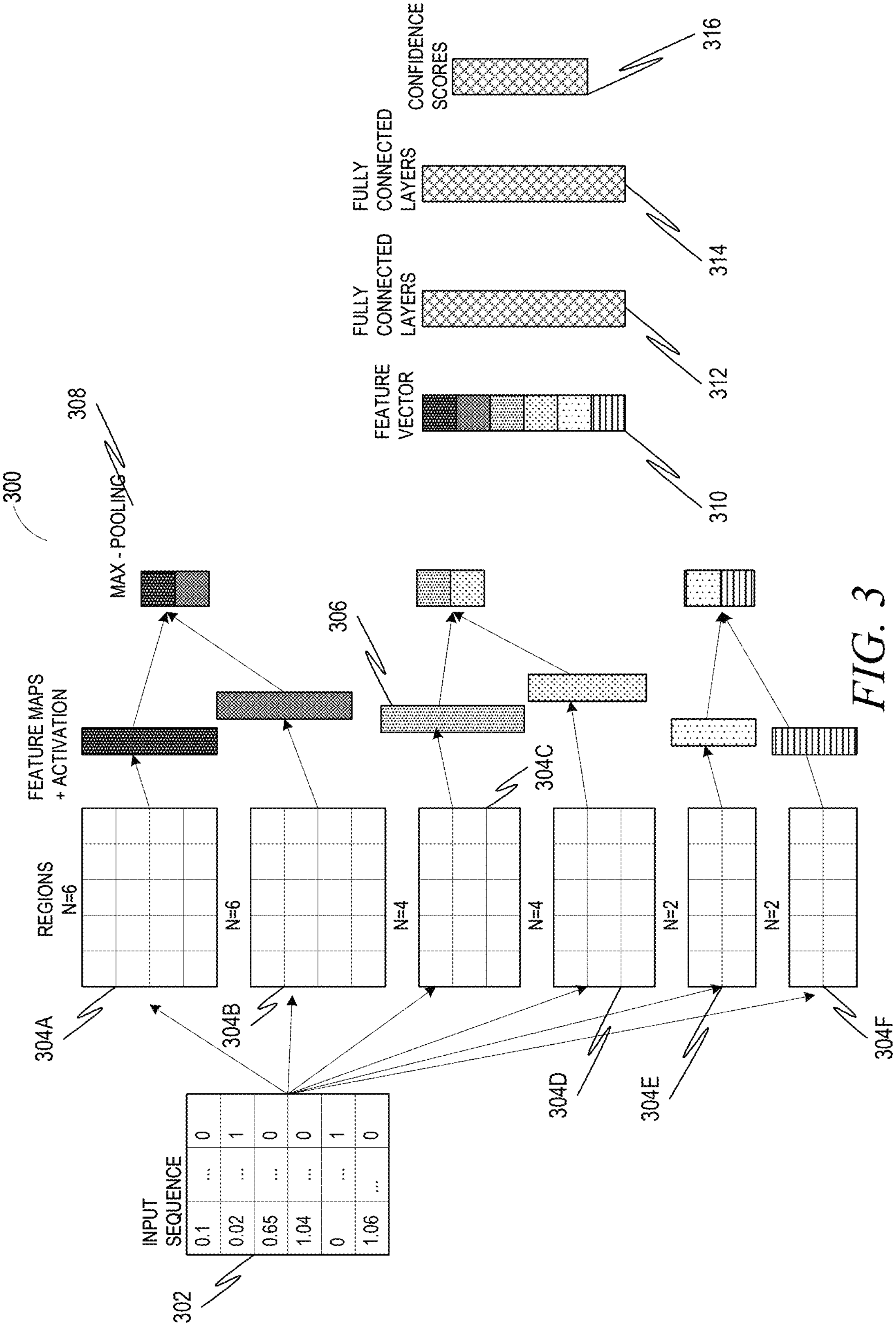
FIG. 3 is block diagram illustrating an example convolutional neural network and fully connected layer architecture.

In an example embodiment, the machine learned model 118 may be a convolutional neural network (CNN) with fully connected layers. FIG. 3 is block diagram illustrating a convolutional neural network and fully connected layer architecture 300, in accordance with an example embodiment. As mentioned before, the concatenated transformed input 302 may be a sequence of vectors of character embeddings, coordinates, and labels. This concatenated transformed input 302 may be fed into several convolutional filters 304A-304F of different width, corresponding to several different n-grams. The output are feature maps 306, which are reduced along the sequence dimension using max pooling layers 308. The result is a single feature vector per feature map. Each of these feature vectors is then concatenated into a final feature vector 310, which is passed through fully connected layers 312, 314. The last layer, a softmax layer 316, predicts class (label) and confidence for the extracted piece of data.

Training of the machine learned model 118 is performed using a multi-label classification task. This means that the machine learned model 118 is able to output probabilities (confidences) for all trained classes. In particular, the confidence for the particular class that was provided with the input text is of interest (the prediction class label from the independent model). This may be extracted from the corresponding class value in the softmax layer 316 output. If the machine learned model 118 determines that the extracted piece of text is of the same class as the predicted class, then a high confidence value is expected.

Figure 4:
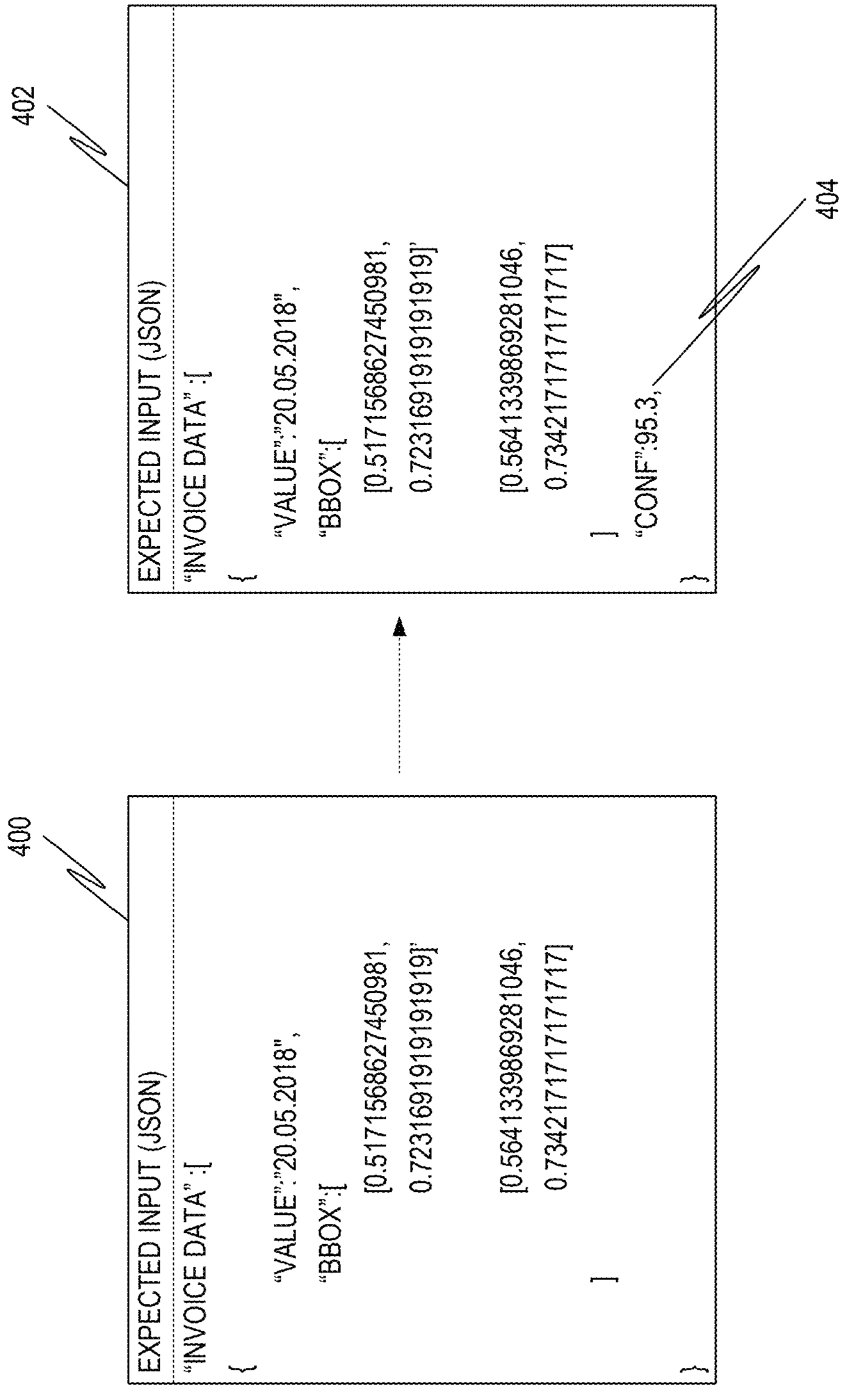
FIG. 4 is a diagram illustrating an example of expected input and sliding window output.

In a final post-processing step, a new attribute may be added to the extracted piece of text 104: a confidence key value pair. The key is "conf", value, with value being the score obtained from the above model inference process. FIG. 4 is a diagram illustrating an example of expected input 400 and sliding window output 402 in accordance with an example embodiment. As can be seen, the sliding window output 402 includes the additional key-value pair 404 described above.

Furthermore, in an example embodiment, the machine learned model 118 is trained to differentiate between correct and incorrect extraction information Therefore, it becomes important to provide incorrect (negative) training data in addition to positive training data. One issue, however, is that oftentimes training data in this field is largely, if not completely, comprised of correct (positive) samples. Namely, it is common for training data to comprise pieces of text and labels indicating what class the corresponding piece of data is in (as opposed to indicating a class the corresponding piece of data is not in). Thus, in an example embodiment, a special protocol is used to generate synthetic negative samples. More particularly, an arbitrary word is taken from a document and that arbitrary word is assigned a random predicted class to it. This random predicted class is identified as a negative label. Since the odds of randomly assigning a correct label to an arbitrary word is low, in the long run the negative samples will generally be correct in their classification of the label as being "incorrect".

Input words for this synthetic generation of negative labels can be selected based on the type of field. The first attribute is the length of prediction, where for fields with single and multiple words, generally single and multi-word instances, respectively, are selected. The second attribute is line location—a geometric position of the word taken from single line or multiple consequent lines.

Furthermore, the number of negative labels synthetically generated can be monitored to ensure that a particular desired ratio of positive and negative samples exist in the training data. For example, a balanced 50/50 ratio between positive and negative samples may be desired, and thus the generation of synthetic negative labels may be controlled to maintain that balance (or as close as possible).

Expected calibration error (ECE) is a metric that quantifies how well confidence scores are calibrated. A lower ECE value corresponds to confidences being closer to accuracies (i.e., better calibrated confidence scores). ECE is the weighted average of the absolute value of the deviation of averaged confidences, after binning predictions into confidence score intervals (e.g., [0,0.1], [0.1,0.2], . . . , [0.9, 1]) and calculating the average confidence for each bin B, or:

$$ECE = \sum_{m=1}^{M} \frac{|B_m|}{n} |acc(B_m) - conf(B_m)|$$

Experiments performed by the inventors of the techniques describe in the present disclosure have shown that the sliding-window confidence scores may enhance calibration (higher ECE scores).

Since the sliding window confidence scores are so much better calibrated, they may be utilized instead of the confidence score(s) output by the original model. In case where the original model produced no confidence score(s), the sliding window confidence scores may additionally be used. The result is that automation may be performed using the confidence scores produced by the sliding window confidence scores, on predictions made by models other than the machine learned sliding window model.

This automation may utilize one or more thresholds to determine where to "Set the bar" for an automated action to occur. For example, a threshold of 90% may be set such that if the confidence score for a particular prediction is equal to or greater than 90%, the prediction will automatically be used in a subsequent task without needing user input, such as prepopulating a field of a record with the prediction. Another threshold may be used for partial automation. For example, a threshold of 90% may be set such that if the confidence score for a particular prediction is equal to or greater than 80%, but less than 90%, a subsequent task is automatically performed (e.g., a field prepopulated), but a user may be prompted to double check the accuracy of the subsequent task.

Additionally, the threshold itself may vary based on context. For example, each tenant in a multi-tenant system may have its own threshold (or set of thresholds). Additionally, each class of data may have its own threshold (or set of thresholds).

Feedback may be received from users to measure the quality of confidences and to potentially perform retraining of the sliding window machine learned model.

Figure 5:
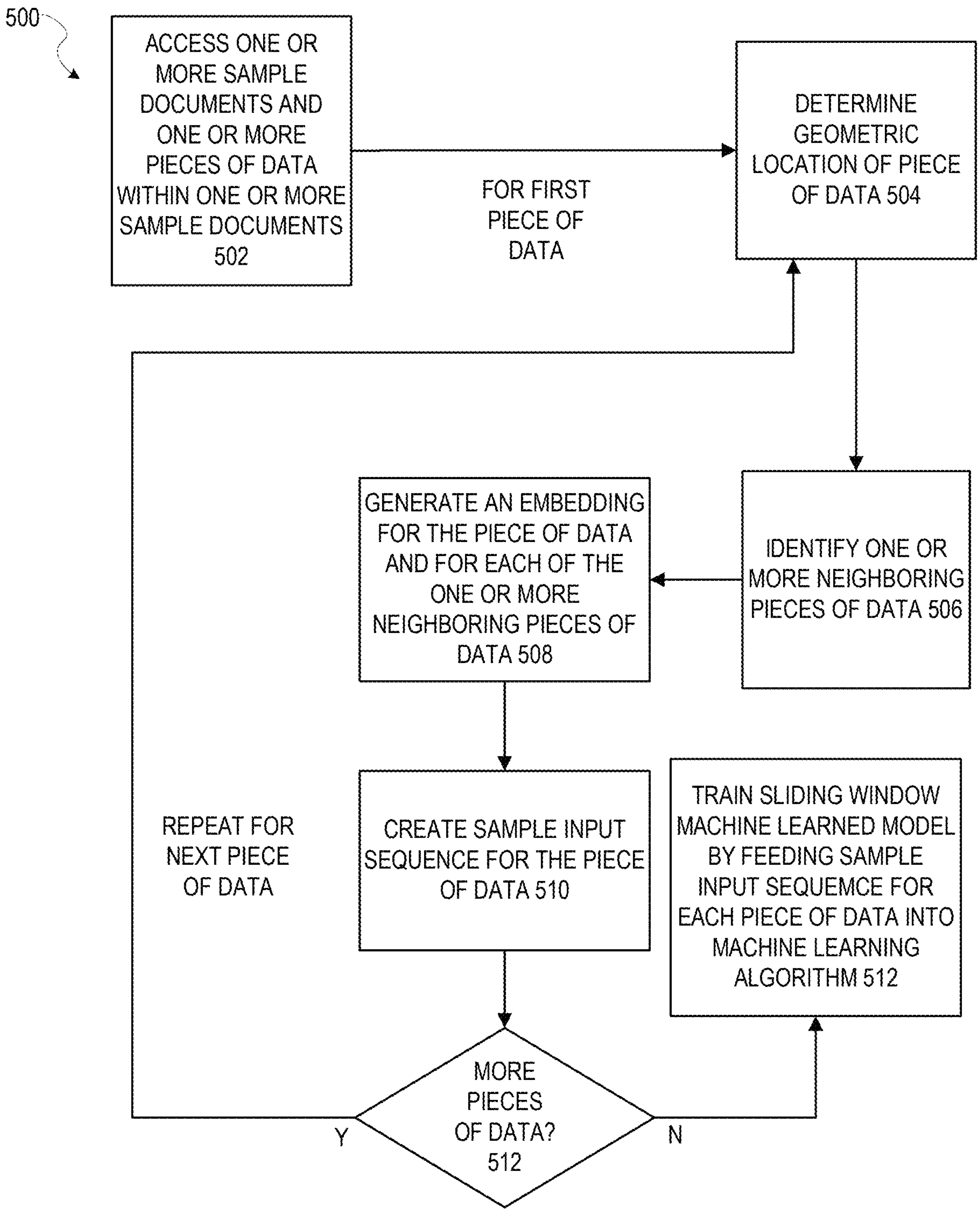
FIG. 5 is a flow diagram illustrating an example method of training a sliding scale machine learned model using a machine learning algorithm.

FIG. 5 is a flow diagram illustrating a method 500 of training a sliding scale machine learned model using a machine learning algorithm, in accordance with an example embodiment. At operation 502, one or more sample documents are accessed, as well as one or more pieces of data within the one or more sample documents. Each piece of data has been assigned a label. This label may represent "ground truth" about the piece of data, such as a class of the data. Then a loop is begun for each of the one or more pieces of data in each sample document. At operation 504, a geometric location of the piece of data within the sample document is determined. This geometric location may be, for example, a coordinate or series of coordinates.

At operation 506, one or more neighboring pieces of data is identified. Each neighboring piece of data is geometrically located within the sample document in a vicinity of the piece of data. In an example embodiment, some piece of data is considered to be a neighbor of the piece of data if it is within a bounding box. The bounding box, as described earlier, can be any geometric shape that includes the piece of data. Each neighboring pieces of data in the sample document has a label.

At operation 508, an embedding is generated for the piece of data and for each of the one or more neighboring pieces of data. Then, at operation 510 a sample input sequence for the piece of data is created by combining the embedding for the piece of data, the geometric location of the piece of data, the label for the piece of data, and, for each neighboring piece of data, the embedding for the neighboring piece of data, the geometric location of the neighboring piece of data, and the label for the neighboring piece of data. At operation 512, a sliding window machine learned model is trained to output a confidence score by feeding the sample input sequence for each of the one or more pieces of data into a machine learning algorithm.

Figure 6:
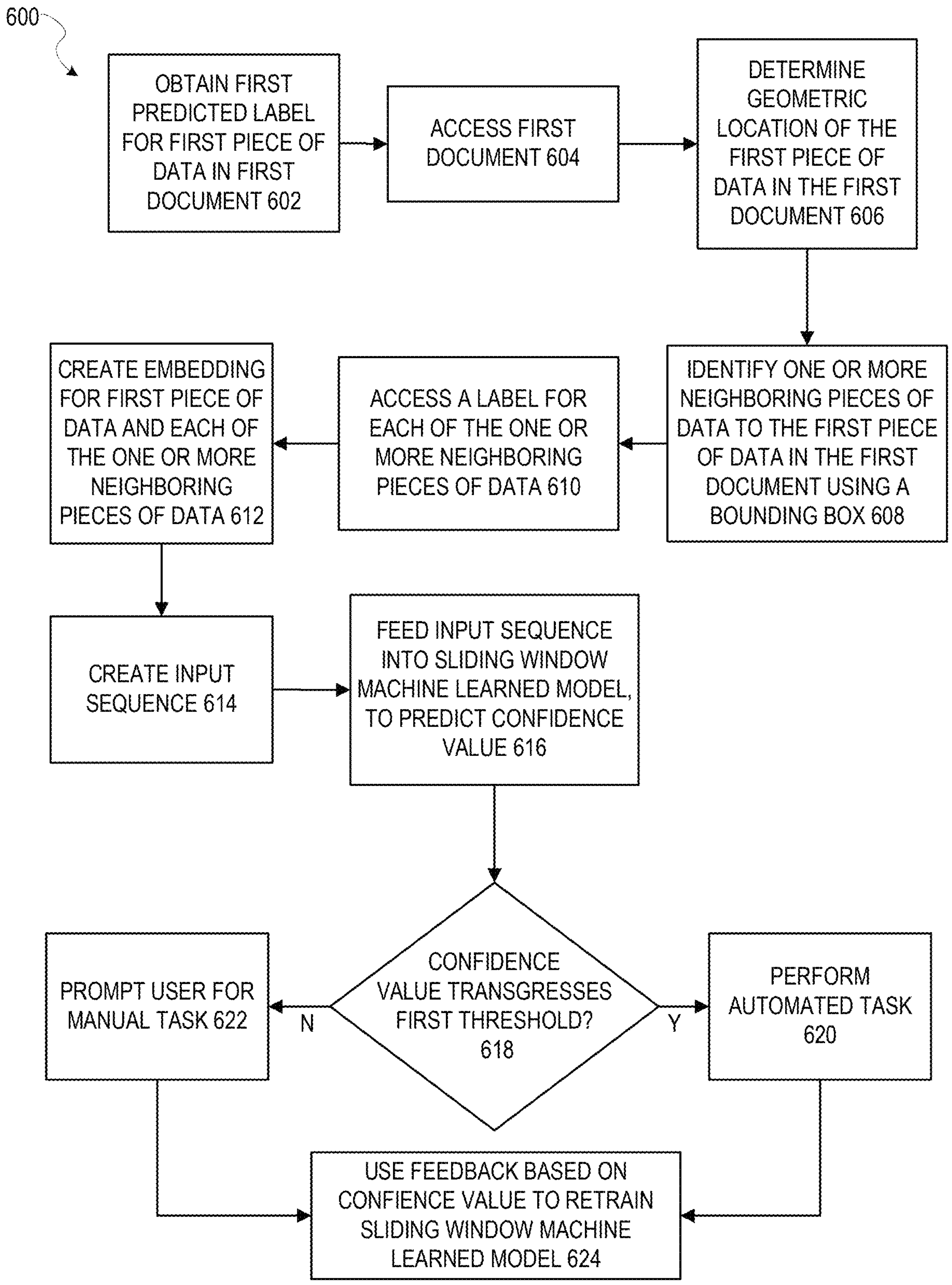
FIG. 6 is a flow diagram illustrating an example method of using a sliding scale machine learned model.

FIG. 6 is a flow diagram illustrating a method 600 of using a sliding scale machine learned model in accordance with an example embodiment. At operation 602, a first predicted label for a first piece of data in a first document is obtained. This first predicted label may have been output by a first model, which may or may not have been a machine learned model.

At operation 604, the first document is accessed. At operation 606, a geometric location of the first piece of data in the first document is determined. In an example embodiment, a coordinate system may be laid out on top of the first document, and the set of coordinates where the first piece of data (or the center of the first piece of data) is located within the first document is taken as the location. At operation 608, one or more neighboring pieces of data to the first piece of data in the first document are identified using a bounding box. This may utilize the locations of each of the one or more neighboring pieces of data in the coordinate system, and the bounding box may be defined by a series of coordinates identifying corners of the bounding box.

At operation 610, a label for each of the one or more neighboring pieces of data is accessed. At operation 612, embeddings for the first piece of data and each of the one or more neighboring pieces of data are generated. At operation 614, an input sequence is created based on the embedding for the first piece of data, the first predicted label, the location of the first piece of data, and, for each neighboring piece of data, the embedding for the neighboring piece of data, the label for the neighboring piece of data, and the location of the neighboring piece of data. In an example embodiment, the input sequence is a concatenation of these pieces of information.

At operation 616, the input sequence is fed into a sliding window machine learned model, which predicts a confidence value for the first predicted label. At operation 618, the confidence value is compared with a first threshold. If the confidence value transgresses the first threshold, then at operation 620 an automatic task (such as prepopulating a field) is performed using the first predicted label and/or first piece of data. If not, then at operation 622 a user is prompted for a manual task (such as filling in a field manually). At operation 624, feedback based on the confidence value is used to retrain the sliding window machine learned model, by passing the feedback along with the input sequence to a machine learning algorithm.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Example 1

A system comprising:

at least one hardware processor; and a computer-readable medium storing instructions that, when executed by the at least one hardware processor, cause the at least one hardware processor to perform operations comprising:

accessing one or more sample documents, as well as one or more pieces of data within the one or more sample documents, each piece of data having been assigned a label;

for each of the one or more pieces of data:

determining a geometric location of the piece of data within a sample document in the one or more sample documents;

identifying one or more neighboring pieces of data, each neighboring piece of data being geometrically located within the sample document in a vicinity of the piece of data, each of the one or more neighboring pieces of data having a label;

generating an embedding for the piece of data and for each of the one or more neighboring pieces of data; and creating a sample input sequence for the one or more pieces of data by combining the embedding for the piece of data, the geometric location of the piece of data, the label for the piece of data, and, for each neighboring piece of data, the embedding for the neighboring piece of data, the geometric location of the neighboring piece of data, and the label for the neighboring piece of data; and training a sliding window machine learned model to output a confidence score by feeding the sample input sequence for each of the one or more pieces of data into a machine learning algorithm.

Example 2

The system of Example 1, wherein the machine learning algorithm is a convolutional neural network and fully connected layer architecture.

Example 3

The system of Examples 1 or 2, wherein the convolutional neural network has a plurality of parallel one dimensional convolutional layers of different filter width.

Example 4

The system of Example 3, wherein each filter width corresponds to a different n-gram width.

Example 5

The system of Example 3, wherein the convolutional neural network has a max pooling layer.

Example 6

The system of any of Examples 1-5, wherein the training uses a multi-label classification task.

Example 7

The system of any of Examples 1-6, wherein each label denotes a different class of data.

Example 8

The system of any of Examples 1-7, wherein each combination of piece of data and label constitutes a training sample, and wherein some of the training samples are positive training samples and some of the training samples are negative training samples.

Example 9

The system of Example 8, wherein the operations further comprise determining if a predetermined ratio of positive training samples to negative training samples has been achieved and, if not, automatically generating negative training samples to achieve the predetermined ratio.

Example 10

The system of Example 9, wherein a negative training sample is automatically generated by taking a piece of data lacking a label and randomly assigning it a label.

Example 11

A method comprising:

accessing one or more sample documents, as well as one or more pieces of data within the one or more sample documents, each piece of data having been assigned a label;

for each of the one or more pieces of data:

determining a geometric location of the piece of data within a sample document in the one or more sample documents;

identifying one or more neighboring pieces of data, each neighboring piece of data being geometrically located within the sample document in a vicinity of the piece of data, each of the one or more neighboring pieces of data having a label;

generating an embedding for the piece of data and for each of the one or more neighboring pieces of data; and creating a sample input sequence for the one or more pieces of data by combining the embedding for the piece of data, the geometric location of the piece of data, the label for the piece of data, and, for each neighboring piece of data, the embedding for the neighboring piece of data, the geometric location of the neighboring piece of data, and the label for the neighboring piece of data; and training a sliding window machine learned model to output a confidence score by feeding the sample input sequence for each of the one or more pieces of data into a machine learning algorithm.

Example 12

The method of c Example 11, wherein the machine learning algorithm is a convolutional neural network and fully connected layer architecture.

Example 13

The method of Example 11 or 12, wherein the convolutional neural network has a plurality of paralleled one dimensional convolutional layers of different filter width.

Example 14

The method of Example 13, wherein each filter width corresponds to a different n-gram width.

Example 15

The method of Example 13, wherein the convolutional neural network has a max pooling layer.

Example 16

The method of any of Examples 11-15, wherein the training uses a multi-label classification task.

Example 17

A non-transitory machine-readable medium storing instructions which, when executed by one or more processors, cause the one or more processors to perform operations comprising:

accessing one or more sample documents, as well as one or more pieces of data within the one or more sample documents, each piece of data having been assigned a label;

for each of the one or more pieces of data:

determining a geometric location of the piece of data within a sample document in the one or more sample documents;

identifying one or more neighboring pieces of data, each neighboring piece of data being geometrically located within the sample document in a vicinity of the piece of data, each of the one or more neighboring pieces of data having a label;

generating an embedding for the piece of data and for each of the one or more neighboring pieces of data; and creating a sample input sequence for the one or more pieces of data by combining the embedding for the piece of data, the geometric location of the piece of data, the label for the piece of data, and, for each neighboring piece of data, the embedding for the neighboring piece of data, the geometric location of the neighboring piece of data, and the label for the neighboring piece of data; and training a sliding window machine learned model to output a confidence score by feeding the sample input sequence for each of the one or more pieces of data into a machine learning algorithm.

Example 18

The non-transitory machine-readable medium of Example 17, wherein each combination of piece of data and label constitutes a training sample, and wherein some of the training samples are positive training samples and some of the training samples are negative training samples.

Example 19

The non-transitory machine-readable medium of Example 18, wherein the operations further comprise determining if a predetermined ratio of positive training samples to negative training samples has been achieved and, if not, automatically generating negative training samples to achieve the predetermined ratio.

Example 20

The non-transitory machine-readable medium of Example 19, wherein a negative training sample is automatically generated by taking a piece of data lacking a label and randomly assigning it a label.

Figure 7:
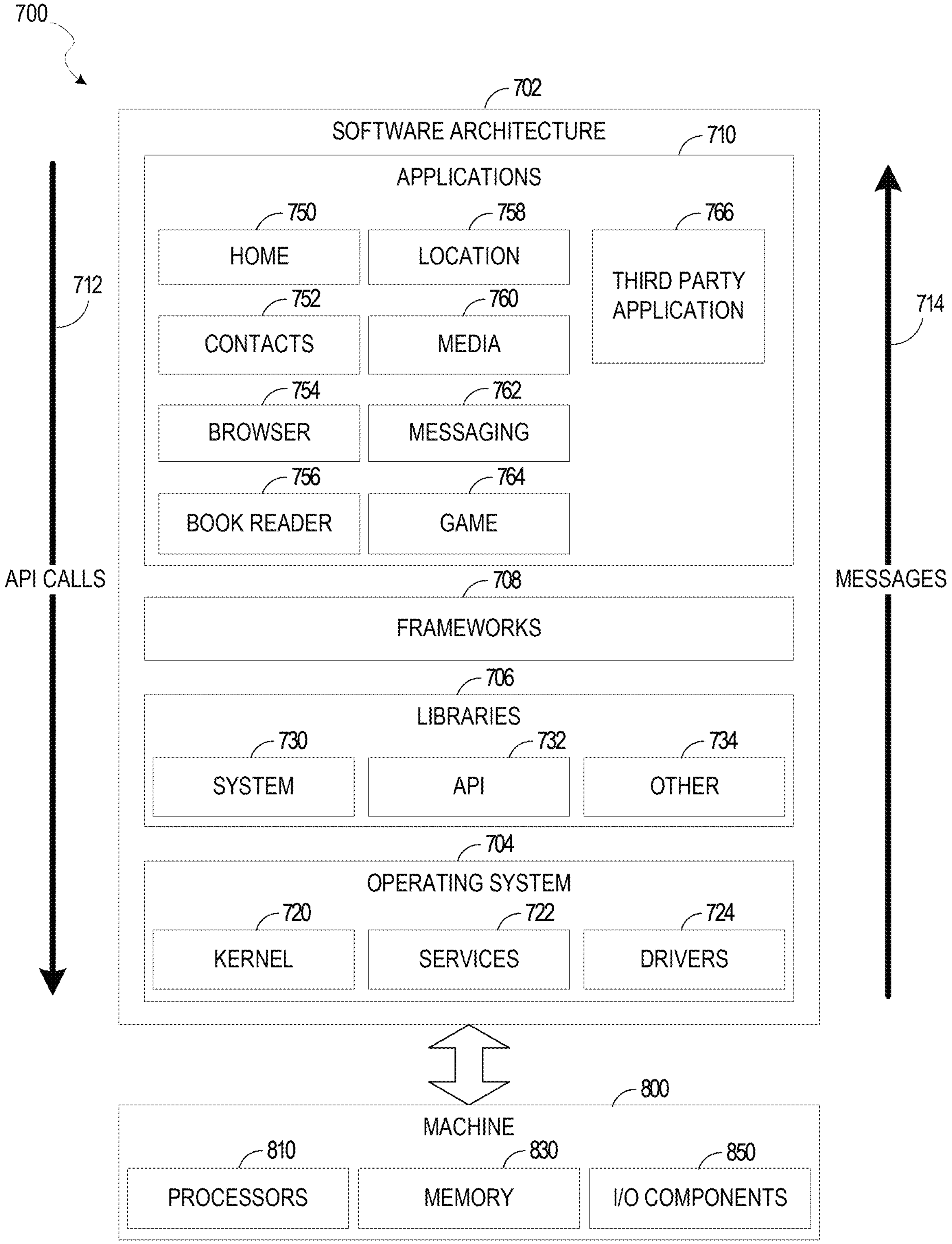
FIG. 7 is a block diagram illustrating an example architecture of software, which can be installed on any one or more of the devices described above.

FIG. 7 is a block diagram 700 illustrating a software architecture 702, which can be installed on any one or more of the devices described above. FIG. 7 is merely a non-limiting example of a software architecture, and it will be appreciated that many other architectures can be implemented to facilitate the functionality described herein. In various embodiments, the software architecture 702 is implemented by hardware such as a machine 800 of FIG. 8 that includes processors 810, memory 830, and input/output (I/O) components 850. In this example architecture, the software architecture 702 can be conceptualized as a stack of layers where each layer may provide a particular functionality. For example, the software architecture 702 includes layers such as an operating system 704, libraries 706, frameworks 708, and applications 710. Operationally, the applications 710 invoke Application Program Interface (API) calls 712 through the software stack and receive messages 714 in response to the API calls 712, consistent with some embodiments.

In various implementations, the operating system 704 manages hardware resources and provides common services. The operating system 704 includes, for example, a kernel 720, services 722, and drivers 724. The kernel 720 acts as an abstraction layer between the hardware and the other software layers, consistent with some embodiments. For example, the kernel 720 provides memory management, processor management (e.g., scheduling), component management, networking, and security settings, among other functionality. The services 722 can provide other common services for the other software layers. The drivers 724 are responsible for controlling or interfacing with the underlying hardware. For instance, the drivers 724 can include display drivers, camera drivers, BLUETOOTH® or BLUETOOTH® Low-Energy drivers, flash memory drivers, serial communication drivers (e.g., Universal Serial Bus (USB) drivers), Wi-Fi® drivers, audio drivers, power management drivers, and so forth.

In some embodiments, the libraries 706 provide a low-level common infrastructure utilized by the applications 710. The libraries 706 can include system libraries 730 (e.g., C standard library) that can provide functions such as memory allocation functions, string manipulation functions, mathematic functions, and the like. In addition, the libraries 706 can include API libraries 732 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two-dimensional (2D) and three-dimensional (3D) in a graphic context on a display), database libraries (e.g., SQLite to provide various relational database functions), web libraries (e.g., WebKit to provide web browsing functionality), and the like. The libraries 706 can also include a wide variety of other libraries 734 to provide many other APIs to the applications 710.

The frameworks 708 provide a high-level common infrastructure that can be utilized by the applications 710. For example, the frameworks 708 provide various graphical user interface (GUI) functions, high-level resource management, high-level location services, and so forth. The frameworks 708 can provide a broad spectrum of other APIs that can be utilized by the applications 710, some of which may be specific to a particular operating system 704 or platform.

In an example embodiment, the applications 710 include a home application 750, a contacts application 752, a browser application 754, a book reader application 756, a location application 758, a media application 760, a messaging application 762, a game application 764, and a broad assortment of other applications, such as a third-party application 766. The applications 710 can are programs that execute functions defined in the programs. Various programming languages can be employed to create one or more of the applications 710, structured in a variety of manners, such as object-oriented programming languages (e.g., Objective-C, Java, or C++) or procedural programming languages (e.g., C or assembly language). In a specific example, the third-party application 766 (e.g., an application developed using the ANDROID™ or IOS™ software development kit (SDK) by an entity other than the vendor of the particular platform) may be mobile software running on a mobile operating system such as IOS™, ANDROID™ WINDOWS® Phone, or another mobile operating system. In this example, the third-party application 766 can invoke the API calls 712 provided by the operating system 704 to facilitate functionality described herein.

Figure 8:
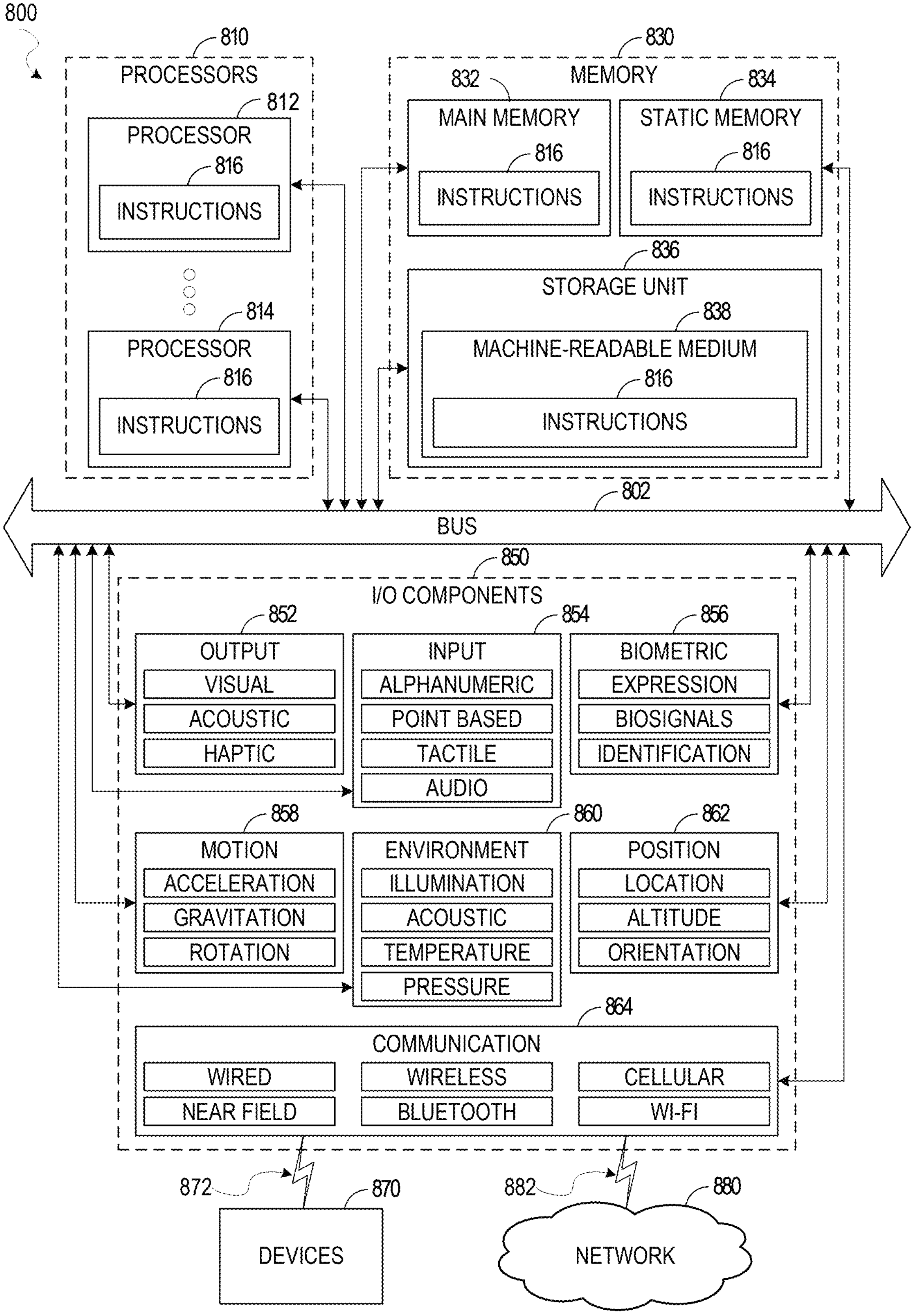
FIG. 8 illustrates a diagrammatic representation of a machine in the form of a computer system within which a set of instructions may be executed for causing the machine to perform any one or more of the methodologies discussed herein.

FIG. 8 illustrates a diagrammatic representation of a machine 800 in the form of a computer system within which a set of instructions may be executed for causing the machine 800 to perform any one or more of the methodologies discussed herein. Specifically, FIG. 8 shows a diagrammatic representation of the machine 800 in the example form of a computer system, within which instructions 816 (e.g., software, a program, an application, an applet, an app, or other executable code) for causing the machine 800 to perform any one or more of the methodologies discussed herein may be executed. For example, the instructions 816 may cause the machine 800 to execute the methods of FIGS. 5 and 6. Additionally, or alternatively, the instructions 816 may implement FIGS. 1-6 and so forth. The instructions 816 transform the general, non-programmed machine 800 into a particular machine 800 programmed to carry out the described and illustrated functions in the manner described. In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 816, sequentially or otherwise, that specify actions to be taken by the machine 800. Further, while only a single machine 800 is illustrated, the term "machine" shall also be taken to include a collection of machines 800 that individually or jointly execute the instructions 816 to perform any one or more of the methodologies discussed herein.

The machine 800 may include processors 810, memory 830, and I/O components 850, which may be configured to communicate with each other such as via a bus 802. In an example embodiment, the processors 810 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 812 and a processor 814 that may execute the instructions 816. The term "processor" is intended to include multi-core processors that may comprise two or more independent processors (sometimes referred to as "cores") that may execute instructions 816 contemporaneously. Although FIG. 8 shows multiple processors 810, the machine 800 may include a single processor 812 with a single core, a single processor 812 with multiple cores (e.g., a multi-core processor 812), multiple processors 812, 814 with a single core, multiple processors 812, 814 with multiple cores, or any combination thereof.

The memory 830 may include a main memory 832, a static memory 834, and a storage unit 836, each accessible to the processors 810 such as via the bus 802. The main memory 832, the static memory 834, and the storage unit 836 store the instructions 816 embodying any one or more of the methodologies or functions described herein. The instructions 816 may also reside, completely or partially, within the main memory 832, within the static memory 834, within the storage unit 836, within at least one of the processors 810 (e.g., within the processor's cache memory), or any suitable combination thereof, during execution thereof by the machine 800.

The I/O components 850 may include a wide variety of components to receive input, provide output, produce output, transmit information, exchange information, capture measurements, and so on. The specific I/O components 850 that are included in a particular machine will depend on the type of machine. For example, portable machines such as mobile phones will likely include a touch input device or other such input mechanisms, while a headless server machine will likely not include such a touch input device. It will be appreciated that the I/O components 850 may include many other components that are not shown in FIG. 8. The I/O components 850 are grouped according to functionality merely for simplifying the following discussion, and the grouping is in no way limiting. In various example embodiments, the I/O components 850 may include output components 852 and input components 854. The output components 852 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 854 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 850 may include biometric components 856, motion components 858, environmental components 860, or position components 862, among a wide array of other components. For example, the biometric components 856 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 858 may include acceleration sensor components (e.g., accelerometer), gravitation sensor components, rotation sensor components (e.g., gyroscope), and so forth. The environmental components 860 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 862 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 850 may include communication components 864 operable to couple the machine 800 to a network 880 or devices 870 via a coupling 882 and a coupling 872, respectively. For example, the communication components 864 may include a network interface component or another suitable device to interface with the network 880. In further examples, the communication components 864 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 870 may be another machine or any of a wide variety of peripheral devices (e.g., coupled via a USB).

Moreover, the communication components 864 may detect identifiers or include components operable to detect identifiers. For example, the communication components 864 may include radio-frequency identification (RFID) tag reader components, NFC smart tag detection components, optical reader components (e.g., an optical sensor to detect one-dimensional bar codes such as Universal Product Code (UPC) bar code, multi-dimensional bar codes such as QR code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 864, such as location via Internet Protocol (IP) geolocation, location via Wi-Fi® signal triangulation, location via detecting an NFC beacon signal that may indicate a particular location, and so forth.

The various memories (i.e., 830, 832, 834, and/or memory of the processor(s) 810) and/or the storage unit 836 may store one or more sets of instructions 816 and data structures (e.g., software) embodying or utilized by any one or more of the methodologies or functions described herein. These instructions (e.g., the instructions 816), when executed by the processor(s) 810, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 880 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 880 or a portion of the network 880 may include a wireless or cellular network, and the coupling 882 may be a Code Division Multiple Access (CDMA) connection, a Global System for Mobile communications (GSM) connection, or another type of cellular or wireless coupling. In this example, the coupling 882 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 816 may be transmitted or received over the network 880 using a transmission medium via a network interface device (e.g., a network interface component included in the communication components 864) and utilizing any one of a number of well-known transfer protocols (e.g., Hypertext Transfer Protocol (HTTP)). Similarly, the instructions 816 may be transmitted or received using a transmission medium via the coupling 872 (e.g., a peer-to-peer coupling) to the devices 870. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 816 for execution by the machine 800, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:

at least one hardware processor; and a computer-readable medium storing instructions that, when executed by the at least one hardware processor, cause the at least one hardware processor to perform operations comprising:

accessing one or more sample documents, as well as one or more pieces of data within the one or more sample documents, each piece of data having been assigned a label based on a prediction made by a first machine learned model, each of the one or more pieces of data in each of the one or more sample documents having a spatial distance between each other when displayed on a computer display;

for each of the one or more pieces of data:

determining a geometric location of the piece of data within a sample document in the one or more sample documents;

identifying one or more neighboring pieces of data, each neighboring piece of data being geometrically and spatially located within the sample document in a vicinity of the piece of data, each of the one or more neighboring pieces of data having a label;

generating a character embedding for the piece of data based on characters contained in the piece of data and generating a character embedding for each of the one or more neighboring pieces of data based on characters contained in each of the one or more neighboring pieces of data; and creating a sample input sequence for the one or more pieces of data by combining the embedding for the piece of data, the geometric location of the piece of data, the label for the piece of data, and, for each neighboring piece of data, the embedding for the neighboring piece of data, the geometric location of the neighboring piece of data, and the label for the neighboring piece of data; and training a sliding window machine learned model independent of the first machine learned model to output a confidence score for the prediction made by the first machine learned model by feeding the sample input sequence for each of the one or more pieces of data into a machine learning algorithm, the training comprising repetitively adjusting weights used in the sliding window machine learned model and evaluating a loss function based on the adjusted weights and the sample input sequence, until the loss function is satisfied.

2. The system of claim 1, wherein the machine learning algorithm is a convolutional neural network and fully connected layer architecture.

3. The system of claim 2, wherein the convolutional neural network has a plurality of parallel one dimensional convolutional layers of different filter width.

4. The system of claim 3, wherein each filter width corresponds to a different n-gram width.

5. The system of claim 3, wherein the convolutional neural network has a max pooling layer.

6. The system of claim 1, wherein the training uses a multi-label classification task.

7. The system of claim 1, wherein each label denotes a different class of data.

8. The system of claim 1, wherein each combination of piece of data and label constitutes a training sample, and wherein some of the training samples are positive training samples and some of the training samples are negative training samples.

9. The system of claim 8, wherein the operations further comprise determining if a predetermined ratio of positive training samples to negative training samples has been achieved and, if not, automatically generating negative training samples to achieve the predetermined ratio.

10. The system of claim 9, wherein a negative training sample is automatically generated by taking a piece of data lacking a label and randomly assigning it a label.

11. A method comprising:

accessing one or more sample documents, as well as one or more pieces of data within the one or more sample documents, each piece of data having been assigned a label based on a prediction made by a first machine learned model, each of the one or more pieces of data in each of the one or more sample documents having a spatial distance between each other when displayed on a computer display;

for each of the one or more pieces of data:

determining a geometric location of the piece of data within a sample document in the one or more sample documents;

identifying one or more neighboring pieces of data, each neighboring piece of data being geometrically and spatially located within the sample document in a vicinity of the piece of data, each of the one or more neighboring pieces of data having a label;

generating a character embedding for the piece of data based on characters contained in the piece of data and generating a character embedding for each of the one or more neighboring pieces of data based on characters contained in each of the one or more neighboring pieces of data; and creating a sample input sequence for the one or more pieces of data by combining the embedding for the piece of data, the geometric location of the piece of data, the label for the piece of data, and, for each neighboring piece of data, the embedding for the neighboring piece of data, the geometric location of the neighboring piece of data, and the label for the neighboring piece of data; and training a sliding window machine learned model independent of the first machine learned model to output a confidence score for the prediction made by the first machine learned model by feeding the sample input sequence for each of the one or more pieces of data into a machine learning algorithm, the training comprising repetitively adjusting weights used in the sliding window machine learned model and evaluating a loss function based on the adjusted weights and the sample input sequence, until the loss function is satisfied.

12. The method of claim 11, wherein the machine learning algorithm is a convolutional neural network and fully connected layer architecture.

13. The method of claim 12, wherein the convolutional neural network has a plurality of paralleled one dimensional convolutional layers of different filter width.

14. The method of claim 13, wherein each filter width corresponds to a different n-gram width.

15. The method of claim 13, wherein the convolutional neural network has a max pooling layer.

16. The method of claim 11, wherein the training uses a multi-label classification task.

17. A non-transitory machine-readable medium storing instructions which, when executed by one or more processors, cause the one or more processors to perform operations comprising:

accessing one or more sample documents, as well as one or more pieces of data within the one or more sample documents, each piece of data having been assigned a label based on a prediction made by a first machine learned model, each of the one or more pieces of data in each of the one or more sample documents having a spatial distance between each other when displayed on a computer display;

for each of the one or more pieces of data:

determining a geometric location of the piece of data within a sample document in the one or more sample documents;

identifying one or more neighboring pieces of data, each neighboring piece of data being geometrically and spatially located within the sample document in a vicinity of the piece of data, each of the one or more neighboring pieces of data having a label;

generating a character embedding for the piece of data based on characters contained in the piece of data and generating a character embedding for each of the one or more neighboring pieces of data based on characters contained in each of the one or more neighboring pieces of data; and creating a sample input sequence for the one or more pieces of data by combining the embedding for the piece of data, the geometric location of the piece of data, the label for the piece of data, and, for each neighboring piece of data, the embedding for the neighboring piece of data, the geometric location of the neighboring piece of data, and the label for the neighboring piece of data; and training a sliding window machine learned model independent of the first machine learned model to output a confidence score for the prediction made by the first machine learned model by feeding the sample input sequence for each of the one or more pieces of data into a machine learning algorithm, the training comprising repetitively adjusting weights used in the sliding window machine learned model and evaluating a loss function based on the adjusted weights and the sample input sequence, until the loss function is satisfied.

18. The non-transitory machine-readable medium of claim 17, wherein each combination of piece of data and label constitutes a training sample, and wherein some of the training samples are positive training samples and some of the training samples are negative training samples.

19. The non-transitory machine-readable medium of claim 18, wherein the operations further comprise determining if a predetermined ratio of positive training samples to negative training samples has been achieved and, if not, automatically generating negative training samples to achieve the predetermined ratio.

20. The non-transitory machine-readable medium of claim 19, wherein a negative training sample is automatically generated by taking a piece of data lacking a label and randomly assigning it a label.

* * * * *